Aug. 4, 1942.    D. G. SMELLIE    2,291,769
AIR CONDITIONING APPARATUS
Filed Jan. 13, 1938    4 Sheets-Sheet 1

INVENTOR
Donald G. Smellie
BY
Harry S. Dumarsz
ATTORNEY

Aug. 4, 1942.    D. G. SMELLIE    2,291,769
AIR CONDITIONING APPARATUS
Filed Jan. 13, 1938    4 Sheets-Sheet 2

INVENTOR
Donald G. Smellie
BY Harry S. Dumars
ATTORNEY

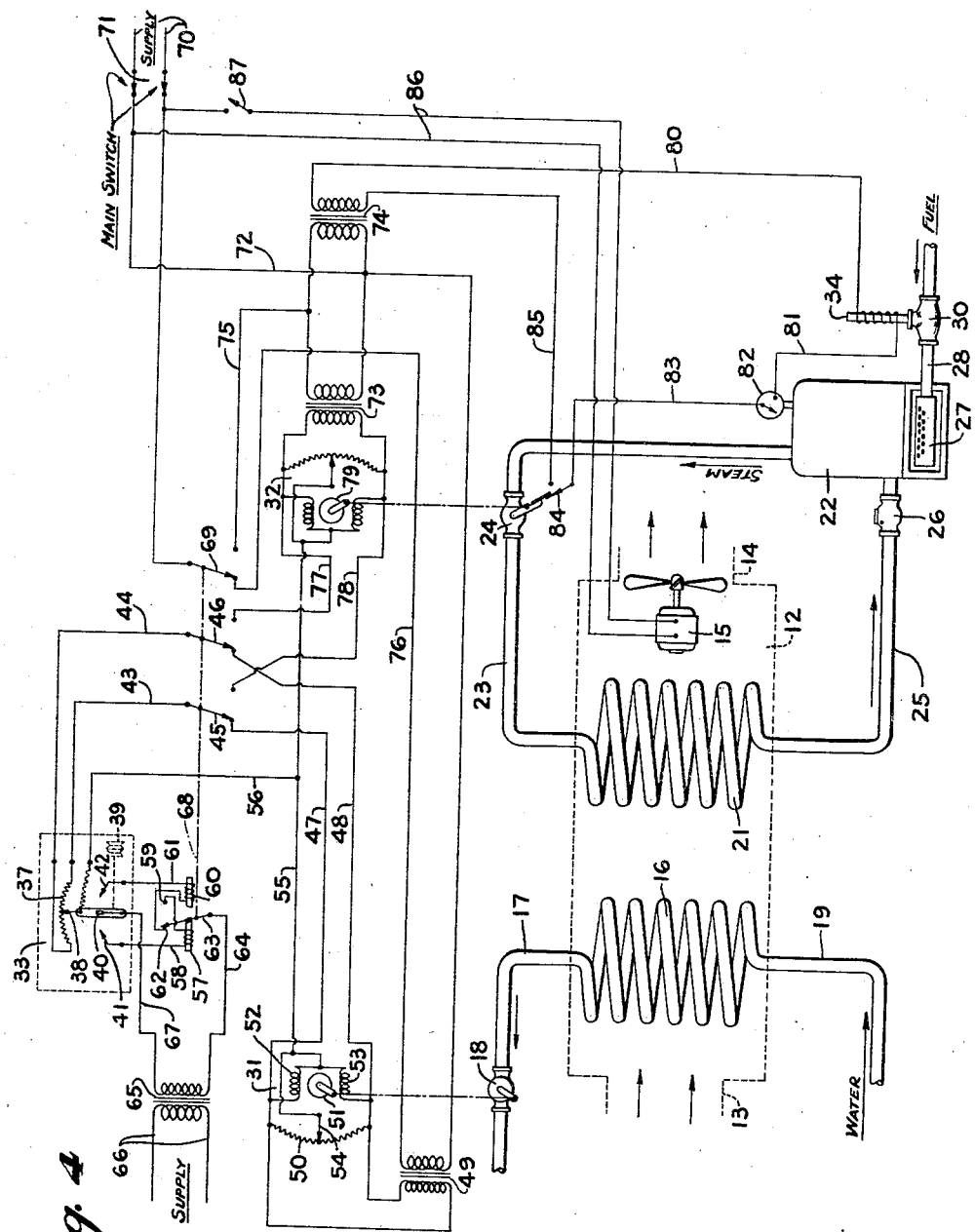

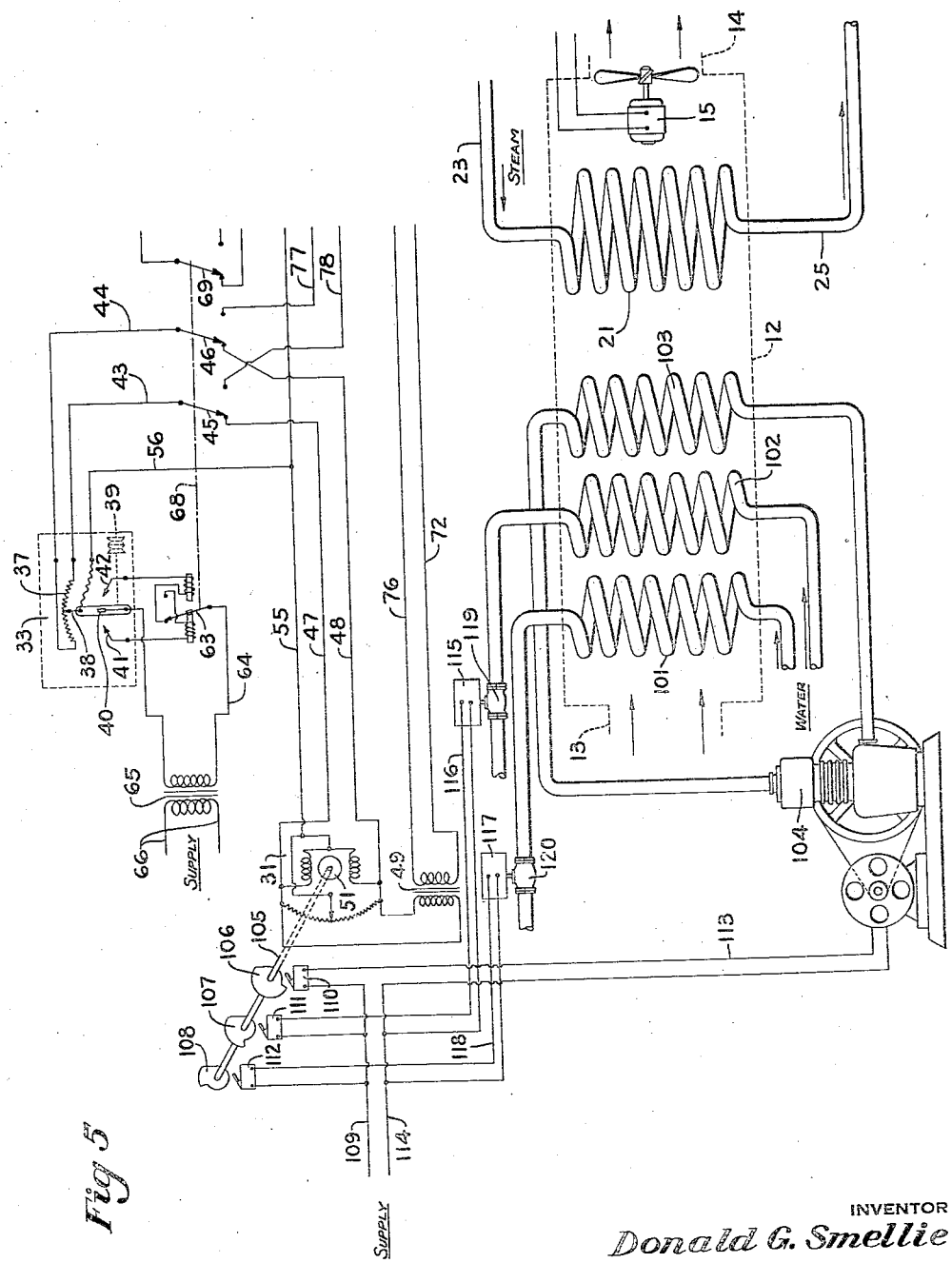

Patented Aug. 4, 1942

2,291,769

UNITED STATES PATENT OFFICE 2,291,769

AIR CONDITIONING APPARATUS

Donald G. Smellie, Canton, Ohio, assignor to The Hoover Company, North Canton, Ohio, a corporation of Ohio Application January 13, 1938, Serial No. 184,755

14 Claims. (Cl. 257—3)

This invention relates to air conditioning systems and more particularly to control mechanisms for said systems.

Air conditioning systems heretofore constructed having heating and cooling means have the disadvantage that the control mechanism cycles the heating and cooling apparatus within wide temperature limits. Also the control mechanism is complex and costly due to the multiple units required to regulate the room temperature, to change over from heating to cooling, and to adjust the temperature settings. Furthermore, the season change-over control is responsive to outdoor conditions with the result that the change-over mechanism is operated in response to atmospheric changes whether or not they are reflected in the space to be air conditioned and independently of conditions in that space.

According to this invention a single control mechanism, which is operated by a single temperature responsive device, modulates the rate of heating or cooling to maintain the desired temperature condition, changes over from heating to cooling when the temperature conditions in the conditioned space require such action, and is readily adjustable by a single regulator to alter the desired temperature conditions.

It is an important object of this invention to provide an air conditioning system which is sharply regulated to maintain a desired temperature condition by a simple control mechanism which also automatically changes over the system from heating to cooling in response to a narrow temperature differential from the permitted narrow normal control temperature range.

There is provided an air conditioning system which is positive in operation and will maintain the conditioned space temperature within very narrow temperature limits. The apparatus is arranged to provide an adjustable season change-over temperature differential; that is, under any given conditions the apparatus maintains the conditioned space within very narrow temperature limits, and a temperature variation therefrom of a very small amount, on the order of one degree or less, instantly causes the system to change from heating to cooling or vice versa. The apparatus is also characterized in that a single adjustment is provided for changing the normal control point but without altering the differential between the normal control point and the season change-over points. Furthermore, the season change-over temperature differential may be adjusted independently of the normal control point, if desired.

Other objects and advantages of the invention will become apparent as the description proceeds when taken in connection with the accompanying drawings, in which:

Figure 4 is a diagrammatic illustration of my invention and the control circuit therefor.

Figure 5 is a diagrammatic illustration of a modification of my invention and the control circuit therefor.

Figure 1:
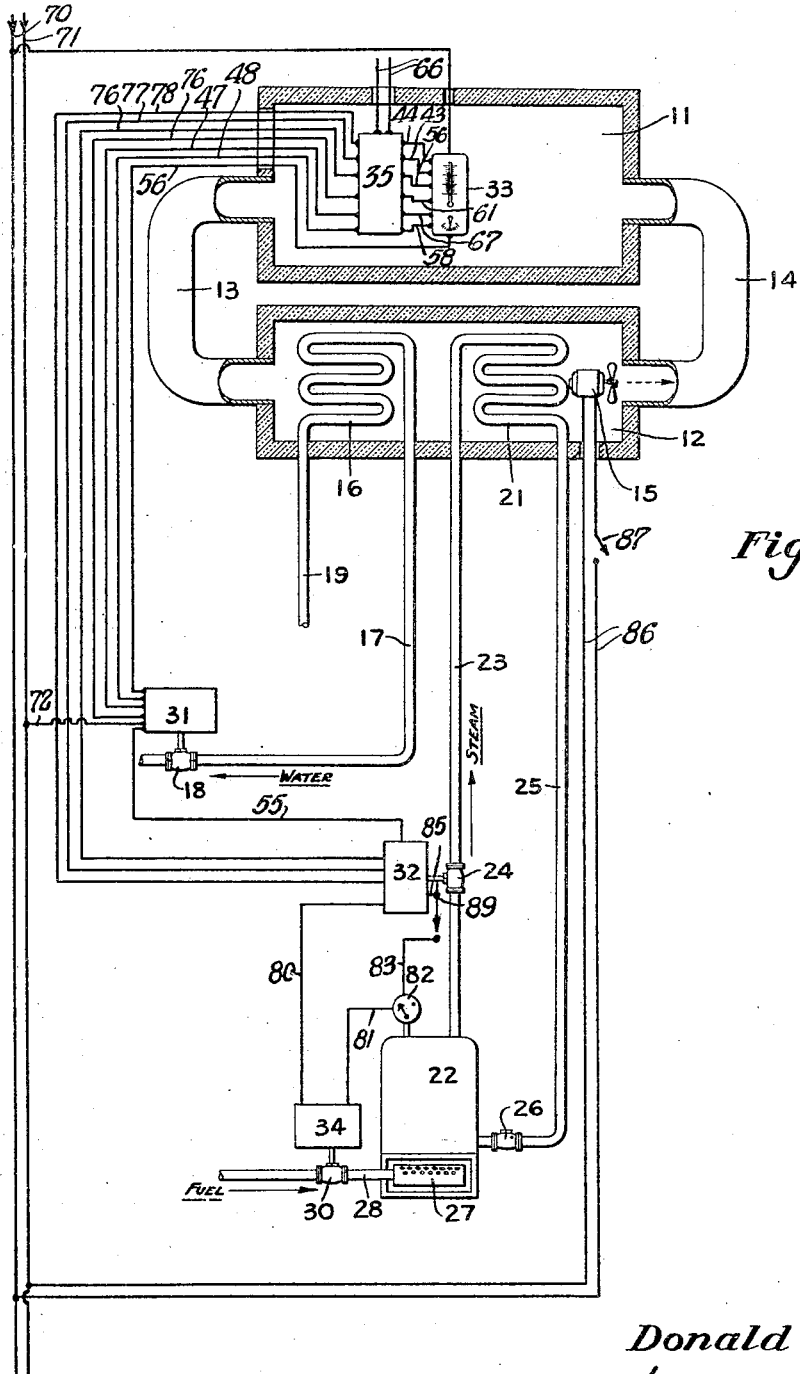
Figure 1 is a diagrammatic illustration of an air conditioning system embodying my invention.

Referring to the drawings in detail and first to Figure 1 thereof, it will be seen that I have illustrated a system comprising a space to be conditioned 11 connected to an air treating chamber 12 by conduits 13 and 14. A motor-driven fan 15 is positioned within the chamber 12 to circulate air through the chambers 11—12 and the conduits 13 and 14. The chamber 12 contains a cooling coil 16 through which cooling water is circulated. Cooling water is supplied to the coil 16 through a conduit 19. Used cooling water is discharged through the conduit 19 which is under the control of a modulating valve 18. This cooling water may be run to waste or it may be cooled in any suitable manner, as by a spray pond, and recirculated.

A heating coil 21 is also mounted within the chamber 12 and is supplied with steam from a boiler 22 through a conduit 23 which is under the control of a modulating valve 24. Condensate formed in the steam coil 21 is returned to the boiler through a conduit 25 and a check valve 26.

The boiler 22 is heated by a suitable heater 27 which is supplied with fuel through a line 28 under the control of a valve 30.

The valves 18 and 24 are actuated by modulating control mechanisms 31 and 32, respectively, which are under the control of a thermostatic mechanism 33 positioned within the space to be conditioned. The valve 30 is actuated by a solenoid mechanism 34 which is also under the control of the thermostatic mechanism 33. The fan 15 preferably operates continuously but it may be controlled by the mechanism 33 if desired. The control circuits interconnecting the source of power, the thermostatic mechanism 33, the valve actuators, 31, 32, and 34 are housed in suitable conduits indicated generally at 35.

Referring now to Figure 4, the control mechanism will be explained in detail. The thermal control element 33 comprises a resistance coil 37 which is adapted to be contacted by a movable slider 38. The slider 38 is actuated by a thermostatic bellows 39 which is responsive to the temperature of the space to be conditioned. The slider 38 carries an electrical contact 40 which is insulated therefrom and is adapted to engage either of a pair of contacts 41 and 42 at the opposite extremes of its movement.

The opposite ends of the resistance coil 37 are connected by a pair of wires 43 and 44 to the movable elements of a pair of switches 45 and 46, respectively. In the position shown, the switches 45 and 46 are connected to the wires 47 and 48, respectively, which bridge the secondary of a transformer 49.

The modulating control element 31 comprises a resistance element 50, corresponding to the resistance element 37 previously described, bridging the wires 47 and 48. Also bridging the wires 47 and 48 is a motor 51 which is provided with a pair of differentially wound field coils 52 and 53. The motor 51 is connected to operate the modulating valve 18 previously described and a slider 54 which contacts the resistance winding 50. The arrangement of the motor is such that when equal currents flow through the windings 52 and 53, there is no rotation of the motor, but, if a greater current should flow through one or the other of these windings, the motor will rotate in one direction or the other depending upon which winding carries the heaviest current. The slider 54 and the connection between the differentially wound field coils 52 and 53 are connected to a wire 55 which is in turn connected through a wire 56 to the slider element 38 previously described.

The contact 41 is connected to a solenoid coil 57 through a wire 58. The other end of the solenoid coil is connected to a switch contact 59. The stationary contact 42 is connected to a solenoid coil 60 through a wire 61. The other end of the solenoid coil 60 is connected to a contact 62. A movable switch blade 63 is arranged to be attracted by the solenoids 57 or 60 depending on which is energized and to make contact with the contacts 62 and 59, respectively. The movable contact 63 is connected by means of a wire 64 to a low voltage transformer 65 which is energized from a suitable source of supply 66. The transformer 65 is also connected by a wire 67 to the central contact 40 on the slider element 38. The arrangement is such that contact between the elements 40 and 41 will energize the solenoid 57 to pull the switch arm 63 into the position shown in Figure 4 if contact 63 is on contact 59; whereby the circuit will be made to shift the switch 63 into engagement with the contact 59 whenever the contacts 40 and 42 are made.

The switch blade 63 is connected by a suitable linkage 68 to the switch blades 45, 46, and a switch blade 69.

Power is supplied through the source of supply 70 which includes a main switch 71. One wire 72 leads from the main switch 71 directly to the primary of transformers 49, 73, and 74. The other primary connections of the transformers 73 and 74 are connected by means of a wire 75 to one of the stationary contacts of the two position switch 69. The other connection to the primary of the transformer 49 is connected by means of the wire 76 to the other stationary contact of the switch 69.

The modulating device 32 is identical with the modulating device 31 previously described and will not be described in detail. The wire 55 is connected to the central portion of the differentially wound coils and to the slider of the modulating device 32. The resistance coil and motor winding of the modulating device 32 are connected in parallel across a pair of wires 77 and 78 which are connected to the secondary of the transformer 73 and to contacts on the two-position switches 45 and 46, respectively.

The motor 79 of the modulating device 32 is connected to operate the modulating valve 24 similarly to the manner in which the modulating valve 18 is operated by the modulating control 31.

One side of the secondary of the transformer 74 is connected by a wire 80 to the solenoid 34 controlling the valve 30. The other side of the solenoid 34 is connected by a wire 81 to a high pressure cut-off switch 82 which is connected by a wire 83 to a cut-off switch 84 operated by the actuating arm of the valve 24. The other side of the secondary of the transformer 74 is connected to the switch 84 by wire 85. The arrangement is such that the switch 84 is closed immediately the modulating valve 24 moves toward open position to supply steam and remains in closed position until steam supply through the valve 24 is discontinued whereupon the switch 84 is opened.

The fan 15 is energized by a supply line 86 which is connected across the supply line and includes a manual switch 87.

During normal operation of the apparatus, the thermostatic bellows 39 responds to temperature changes of the space to be conditioned and shifts the slider 38 along the resistance coil 37. Assuming that the apparatus is in the position shown in Figure 4, that is, that the season change-over control switch blade 63 has moved the switches 45, 46 and 69 to the positions shown thereby conditioning the apparatus for cooling, movement of the slider 38 will unbalance the circuit through the differential field windings 52 and 53 and cause the motor 51 to rotate in one direction or the other. The motor will always rotate in such a direction as to cause the slider 54 to follow the movement of the slider 38; that is, the motor tends to cause the slider 54 to move to such position that it balances or neutralizes the unbalanced current introduced into the circuit by movement of the slider 38 and therefore tends to bring field coils 52 and 53 back into equal and opposite relationship whereby the motor ceases operation. This condition will continue as long as the room stays within the maximum differential permitted and the motor 51 will open and close the valve 18 thereby varying the supply of cooling water through the coil 16 and hence the amount of cooling permitted for the air circulating through the spaces 11 and 12. As the room temperature drops, the supply of cooling water through the valve 18 is gradually decreased and will be discontinued entirely if the temperature should drop sufficiently far. The contacts 41 and 42 are so arranged that movement of the arm 38 a distance corresponding to a change in temperature of approximately one degree beyond either end of the control range on the coil 37 will cause the contact 40 and 41 or 40 and 42 to be made.

Assuming that the room temperature falls below that for which the control mechanism is set, the contacts 40 and 42 will eventually be made. This will complete an electrical circuit from the secondary of the transformer 65 including the solenoid coil 60, the contact 62, the arm 63, the line 64, the contacts 40 and 42, and the line 67 whereby the solenoid 60 snaps the arm 63 to the right as viewed in Figure 4, breaking the circuit just defined and causing arm 63 to rest on contact 59. This movement of the switch arm 63 is transmitted through the arm 68 to the switch arms 45, 46 and 69, whereby these arms will deenergize the circuit through the wires 47, 48 and 76 and will energize the circuit through the wires 78, 77, and 75. This action will deenergize the control mechanism 31, which has already operated completely to close the valve 18, and will energize the control mechanism 32. Also, movement of the switch 69 de-energizes solenoid 49 and energizes the transformers 74 and 73. Energization of the transformer 74 energizes the fuel solenoid valve 34 provided the circuit is closed through the switches 84 and 82. Energization of the control mechanism 32 causes that mechanism to regulate the valve 24 in exactly the same manner in which the valve 18 was regulated by the control mechanism 31 previously described except that a drop in conditioned space temperature will cause the valve 24 to open wider whereas on the cooling cycle a drop in conditioned space temperature causes the valve 18 to close. The switch 84 is closed immediately the motor 79 functions to move the valve 24 to open position and it remains in closed position until the motor 79 returns the valve 24 to closed position.

From the description above it will be seen that I have devised a control mechanism in which a single instrument automatically functions to change over from heating to cooling in response to a fixed and narrow temperature differential and that modulating control within the desired room temperature range is provided for both heating and cooling.

Referring now to Figure 5, it will be seen that I have disclosed a modification of my invention which is chiefly characterized in that a pair of water coils 101 and 102 and an expansion coil 103 for a refrigerating mechanism 104 have replaced the cooling coil 16 previously described. The heating cycle of the mechanism of Figure 5 is identical with that disclosed in connection with Figures 1 and 4. The control mechanism 31 in the modification illustrated in Figure 5 operates a cam shaft 105 instead of operating a valve as in Figure 4. The control mechanism 31 and the thermostatic mechanism 33 are identical with that disclosed in connection with Figure 4 and operate in exactly the same manner. The cam shaft 105 is provided with a plurality of cams 106, 107 and 108, which are designed to operate switches 110, 111, and 112, respectively, and in that order. The switch 110 is connected to a supply line 109 and to a refrigerating mechanism 104 by wire 113. The refrigerating mechanism 104 is connected to the other supply wire 114. The switch 111 is connected to the supply line 109 and to a solenoid valve actuator 115 through a line 116. The solenoid valve 115 is connected to the supply line 114. The switch 112 is connected to a valve actuating solenoid 117 through a wire 118. The solenoid 117 is also connected to the supply line 114.

The solenoid 115 is adapted to open and close a valve 119 which regulates the flow of cooling water through the cooling coil 102. The solenoid 117 is designed to control a valve 120 which regulates the flow of cooling water through the cooling coil 101.

When the thermostatic control mechanism 33 moves to a position to demand a change-over from the heating to the cooling cycle, the control mechanism 31 is energized. As the temperature within the room rises, the slider 38 will unbalance the circuit through the windings and the control mechanism 31 and will cause the switches 110, 111, and 112 to be closed in order. Closure of the switch 110 energizes the refrigerating mechanism 104 which cools the air circulating through the chamber 12 by lowering the temperature of the evaporating coil 103. If this is insufficient to maintain the room temperature within the desired temperature limits, the switch 111 will be closed and will energize the solenoid 115 to open the valve 119 whereby cooling water will flow through the coil 102 adding further cooling capacity to the system. If this cooling capacity is likewise insufficient to carry the load or maintain the room within predetermined temperature limits, the switch 112 will be closed and the solenoid 117 will be energized to open the valve 120 whereby to permit water to flow through the coil 101 and to provide the system with the maximum available refrigerating capacity. As the room temperature drops, the switches 112, 111, and 110 will be opened in that order to decrease the cooling effect. The switchover from cooling to heating is accomplished as explained in connection with Figure 4 above.

If desired, the water-cooling coils may be brought into operation prior to energization of the refrigerating system, or the order of operation may be one water coil, the refrigerating system, and the other water coil. This is accomplished merely by re-arranging the cams on the shaft 105 or by repositioning the switches 110, 111, and 112. The order of cooling will depend upon climatic conditions and personal preferences. The order of removal of the sensible and latent heat content of the air stream will depend upon the relative humidity of the air stream, the temperature desired and the temperature of the cooling water. If humidity can be regulated satisfactorily with the cooling water available, it is desirable to use the relatively cheap water cooling as fully as possible, but, if low humidity is desired or if the cooling water is not at a low temperature the refrigerating system must be started first, or second, in order to keep the humidity within comfortable limits.

Figure 2:
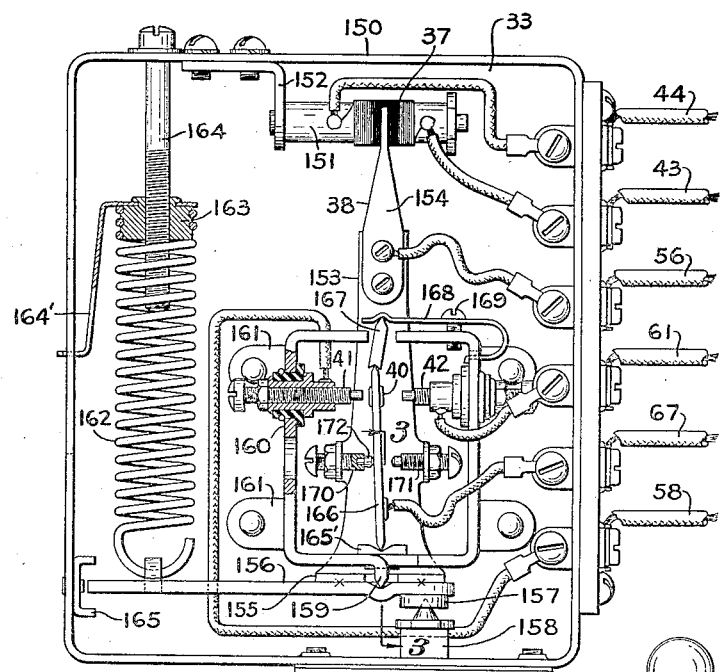
Figure 2 is a detail view of my novel control mechanism.
Figure 3:
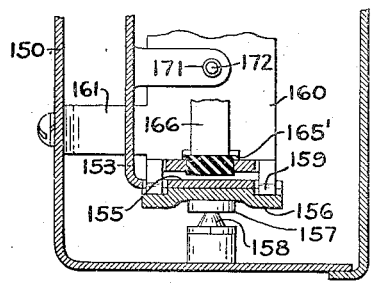
Figure 3 is a detail sectional view taken along the line 3—3 of Figure 2.

The control mechanism per se is disclosed in Figure 2 and includes a casing 150 housing the mechanism 33. The resistance winding 37 is mounted upon a spool 151 which is suitably supported from the top of the casing 150 by a bracket 152. The ends of the resistance winding 37 are connected to the wires 44 and 43 in the manner indicated in Figure 4. The slider element 38 comprises a rocker arm 153 upon which is mounted a contact 154 but insulated from the arm 153. The contact 154 is connected to the wire 56. The bottom portion of the arm 153 is provided with a forwardly projecting foot 155 which is suitably secured as by welding to an actuating and resistance arm 156. The right hand end of the arm 156, as viewed in Figure 2, is provided with a cup 157 which receives the bearing pivot 158 of the bellows 39. The arm 156 is provided on opposite edges thereof with indented portions shaped to receive knife edges 159 which are formed integrally with the bottom portion of a yoke 160. The yoke 160 is rigidly mounted on the rear wall of the casing 150 by means of a plurality of ears 161. The free end of the actuating arm 156 is connected to a resistance spring 162 which is rigidly attached to an adjusting nut 163 mounted upon an adjusting screw 164. The adjusting screw depends from the top wall of the casing 150 and may, if desired, be provided with any suitable form of control dial instead of the slotted screw head shown. An indicating arm 164' is mounted on the nut 163 and projects through a slot in the casing 150 to cooperate with suitable indicia on the exterior thereof. A U-shaped abutment element 165 is mounted on the end wall of the casing 150 and defines the limits of movement of the actuating arm 156.

The stationary contacts 41 and 42 comprise contact screws which are adjustably mounted in opposite arms of the yoke element 160. The contacts 41 and 42 are insulated from the yoke 160. A slotted member 165' of insulating material is rigidly mounted in the bottom portion of the yoke 160 directly above the knife edges 159. The contact 40 is carried on a tumbler element 166 which is provided on one end with a knife edge resting in the insulating member 165' and at its opposite end is provided with a knife edge received by a tumbler element 167. The other end of the tumbler element 167 is provided with a knife edge engaging a snap spring 168 which is rigidly mounted upon the yoke 160. An adjusting screw 169 is provided to regulate the tension of the spring 168. The actuating arm 153 is provided on opposite sides thereof with a pair of adjustable abutment screws 170 and 171 which are adapted to contact the tumbler element 166. The ends of the screws 170 and 171 are provided with insulating plugs 172 adapted to make contact with the tumbler 166.

The arrangement is such that movement of the actuating arm 153 within the narrow temperature differential set for the control mechanism, merely moves the slider 38 along the resistance winding 37 to cause modulation of the heating or cooling valve as the case may be. However, if the temperature exceeds that differential, the actuating arm 153 will be moved beyond its normal range of movement and the contact between the screw 170 or 171 and the tumbler element 166 will snap the tumbler elements 166 and 167 over center and bring the contact 40 into engagement with one of the contacts 41 and 42 to operate the season change-over switches previously described. Immediately the system is changed over from heating to cooling or vice versa, the actuating arm 153 will be moved by the thermostatic mechanism a distance sufficiently great to break engagement between the contact 40 and whichever of the contacts 41 and 42 it was last in contact with; that is, normally the contact 40 carried by the tumbler element 166 moves in a narrow range on one side or the other of its center position and in open circuit condition.

Adjustment of the screw 164 varies the temperature range of the control mechanism and the temperatures at which the bellows 39 operates to change over the system from cooling to heating or vice versa. However, adjustment of the screw 164 in no way affects the differential between the normal temperature range and that required to cause the mechanism to switch-over from heating to cooling or vice versa. It will be seen that an increase in the tension of the spring 162 will raise the effective temperature at which the bellows 39 can operate the actuating arm 153 and the slider 154 to control the heating or cooling mechanism.

The air conditioning system disclosed herein will maintain the temperature of the space to be conditioned within very narrow limits and will cause the air to be heated or cooled, as may be necessary, if the temperature of the conditioned space departs more than a small amount, approximately 1° F., from the limits of the control range which may be on the order of 2° to 4° F.

Heat regulation is accomplished by progressively decreasing the heat supply as the temperature rises and progressively increasing the heat supply as the temperature falls. This tends to equate rate of heat supply to rate of heat loss whereby the heating system is sensitive, and it will not tend to drive the temperature upwardly beyond the control range. The same effects are produced by the progressive abstraction of heat from the air when the cooling apparatus is operative; a rise in the temperature of the air to be conditioned is accompanied by an increase in the cooling capacity and vice versa.

The change-over mechanism operates to cause the conditioning apparatus to change over only when abnormal conditions prevail or the season changes. Temperatures consistent with atmospheric conditions may be maintained by regulating the tension of the spring 162.

The control mechanism includes a temperature responsive means which operates a modulating control mechanism over a narrow temperature range to control one or more modulating actuating devices which operate in synchronism with the modulating control. The control operates to discontinue heating or cooling when the slider is at the high or low temperature ends, respectively, of the normal control temperature range. The control tends to maintain the room temperature at a sharply defined value by decreasing the heating or cooling effect as the room temperature approaches the value for which the control is set. A small change in room temperature above the limits of the normal temperature range when the heater is operating or below the limits of the normal temperature range when the cooling mechanism is operating causes the change-over mechanism to be operated and to change over the system from heating to cooling or vice versa. The normal control temperature range may be shifted at will without altering its extent or the differential between its ends and the change-over points.

The invention disclosed provides for constant and sharp regulation of the air temperature to any desired value and automatically supplies or abstracts heat as conditions require with no attention from the operator. This regulation is under the control of a single thermostatic control mechanism having a single adjustment to regulate temperatures at all seasons and under all conditions.

My invention is not limited to the embodiments shown but may be embodied in other forms without departing from its spirit or the scope of the appended claims.

I claim:

1. Temperature regulating mechanism comprising a modulating control coil, a plurality of modulating devices, movably mounted modulating control means associated with said modulating coil, temperature responsive means connected to operate said movably mounted means, switching mechanism connected to cause one or the other of said modulating means to be operatively connected to said modulating coil means when said movably mounted control means moves to either limit of a predetermined temperature differential, and means for adjusting the temperature range of said modulating control means without affecting the temperature differential between said modulating control means and said switching mechanism.

2. Regulating mechanism including a plurality of modulating actuating means, a modulating control element adapted to operate said modulating actuating means in synchronism therewith, a thermostat for operating said modulating control element means arranged to connect said modulating control element to any one of said actuating means, and means operated by said modulating control element for changing the connections thereof to said modulating actuators in response to a temperature differential exceeding a predetermined temperature range of said modulating control element.

3. Regulating mechanism including a plurality of modulating actuating means, a modulating control element adapted to operate said modulating actuating means in synchronism therewith, a thermostat for operating said modulating control element means arranged to connect said modulating control element to any one of said actuating means, means operated by said modulating control element for changing the connections thereof to said modulating actuators in response to a temperature differential exceeding a predetermined temperature range of said modulating control element, and means for changing the temperature range of said modulating control element without altering said temperature differential.

4. Air conditioning apparatus comprising a plurality of conditioning units, modulating governors connected to regulate each of said conditioning units, a single modulating master control, a condition responsive element connected to actuate said master control, and means actuated by said condition responsive elements for connecting said master control to a selected one of said modulating governors when said condition responsive element responds to temperatures differing by a predetermined amount above or below a preselected control point.

5. Control apparatus comprising a pair of modulating actuating devices, a modulating control, a condition responsive element for actuating said modulating control over a predetermined modulating range, means operated by said modulating control at each end of its range of movement for operatively disconnecting the same from one of said devices and for operatively connecting the same to the other of said devices for operation in a reverse sense with respect to said one device.

6. Control apparatus comprising a pair of modulating actuating devices, a modulating control, a condition responsive element for actuating said modulating control over a predetermined operating range, means operated by said modulating control at each end of its range of movement for operatively disconnecting the same from one of said devices and for operatively connecting the same to the other of said devices in a reverse sense, means for bodily shifting the temperature range of said modulating control without altering the extent thereof, and without affecting its operative relationship with said connecting and disconnecting means.

7. Control apparatus comprising a pair of modulating actuating devices, a modulating control, a condition responsive element for actuating said modulating control over a predetermined operating range, means operated by said modulating control at each end of its range of movement for operatively disconnecting the same from one of said devices and for operatively connecting the same to the other of said devices in a reverse sense, and means for independently altering the relationship between master control at either end of its range of movement and said connecting and disconnecting means.

8. Control mechanism adapted for use with an air conditioning system comprising a pair of operating mechanisms, a regulator, condition responsive means for operating said regulator, and means operated by said regulator for operatively connecting said regulator to a selected one of said operating mechanisms in accordance with a predetermined condition, said connecting means being constructed to connect said regulator to said operating mechanisms in such fashion that they are operated thereby in reverse senses with respect to one another.

9. Air conditioning apparatus comprising a steam generator, a heater for said generator, a radiator operatively connected to said generator, a modulating valve for regulating the supply of steam to said radiator, a cooling unit, means for supplying a cooling medium to said unit, means for regulating the supply of cooling medium to said cooling unit, a modulating drive mechanism operatively connected to said valve, a modulating drive mechanism operatively connected to said regulating means, a modulating regulator, a thermostat connected to operate said regulator over a predetermined range of movement, means operated by said regulator at the ends of said range of movement for operatively connecting the same to a selected one of said modulating drive mechanisms to operate the same in a predetermined manner with respect to the operation of said modulating regulator, said modulating drive mechanisms being so related to said modulating regulator that the heating or cooling devices under the control thereof at any given time are rendered inoperative by said regulator prior to operation of said connecting means thereby.

10. Air conditioning apparatus comprising a heating element, a modulating control for said heating element, a cooling element, a modulating control for said cooling element, a modulating governing means, a thermostat for operating said governing means mechanism constructed and arranged to connect said governing means to a selected one of said modulating control elements, and means actuated by movement of said governing means a predetermined distance above or below a pre-selected control point for actuating said connecting mechanism to de-energize said heating element when the apparatus is conditioned for heating and the governing means exceeds a predetermined temperature above the control point prior to energization of said cooling element and to de-energize said cooling element when the apparatus is conditioned for cooling and the governing means passes a predetermined temperature below the control point prior to energization of said heating element.

11. Air conditioning apparatus comprising a heating element, a modulating control for said heating element, a cooling element, a modulating control for said cooling element, a modulating governing means, a thermostat for operating said governing means mechanism constructed and arranged to connect said governing means to a selected one of said modulating control elements, and means actuated by movement of said governing means a predetermined distance above or below a pre-selected control point for actuating said connecting mechanism to de-energize said heating element when the apparatus is conditioned for heating and the governing means exceeds a predetermined temperature above the control point prior to energization of said cooling element and to de-energize said cooling element when the apparatus is conditioned for cooling and the governing means passes a predetermined temperature below the control point prior to energization of said heating element, and means for changing said control point without altering the differential between the control point and actuating points for the connecting mechanism.

12. Air conditioning apparatus comprising means for heating the air to be conditioned, means for cooling the air to be conditioned, a modulating control mechanism, a thermostat responsive to the temperature of the air to be conditioned for actuating said modulating control mechanism, means actuated by said thermostat in response to a temperature of a predetermined amount above a pre-selected control point for operatively connecting said control mechanism to said heating means, and means actuated by said thermostat in response to a temperature of a predetermined amount below said pre-selected control point for operatively connecting said control mechanism to said cooling means, said control mechanism and connecting means being constructed and arranged to increase the rate at which heat is supplied to the air to be conditioned by said heating means and to decrease the rate at which heat is abstracted from the air to be conditioned by said cooling means in response to a decrease in the temperature of the air being conditioned.

13. Air conditioning apparatus comprising means forming a circulatory system for air to be conditioned, heating means for said circulatory system, cooling means for said circulatory system, control means for said heating and cooling means, a thermostat responsive to the temperature of the space to be conditioned operative to regulate the action of said control means, means for adjusting the control temperature of said thermostat, means operated by said thermostat for changing said air conditioning system from heating to cooling operation or vice versa, said last mentioned means operating on a fixed differential of temperature with respect to the temperature for which said control means is set, and means for adjusting the temperature setting of said thermostat without affecting the temperature differential between said control means and said means for changing the operation of said conditioning system.

14. Thermostatic control mechanism comprising an electrical resistance coil, a movably mounted contact device engaging said resistance coil, temperature responsive means for actuating said contact, a pair of spaced electrical contacts, a snap-acting contact mounted between said spaced contacts, means actuated by said temperature responsive means for actuating said snap-acting contact, the arrangement being such that said snap-acting contact is actuated whenever said temperature responsive means actuates said slidable contact beyond the limits of a fixed range of movement corresponding to a fixed temperature range, a plurality of external control connections for said resistance coil, means under the control of said spaced contacts for connecting said resistance coil to a selected one of said external control connections as determined by the position of said snap-acting contact, and means for adjusting the temperature range of said temperature responsive means.

DONALD G. SMELLIE.